United States Patent [19]

Bentzen-Bilkvist et al.

[11] 4,362,442
[45] Dec. 7, 1982

[54] VENTURI BARGE UNLOADING SYSTEM

[75] Inventors: Ib Bentzen-Bilkvist, Ann Arbor, Mich.; Wayne M. Jacobson, York, Nebr.

[73] Assignees: Dundee Cement Company, Dundee, Mich.; Cyclonaire Corporation, Henderson, Nebr.

[21] Appl. No.: 140,326

[22] Filed: Apr. 14, 1980

[51] Int. Cl.³ .................... B65G 53/14; B65G 53/28
[52] U.S. Cl. .................... 406/109; 55/342;
406/142; 406/173; 406/174;
406/109;120;141;142;143;146;156;173;174
[58] Field of Search .................... 55/302, 342

[56] References Cited

U.S. PATENT DOCUMENTS

| | | | |
|---|---|---|---|
| 2,868,721 | 1/1959 | Bergstrom | 406/143 X |
| 2,889,174 | 6/1959 | Schwing | 406/146 X |
| 3,861,830 | 1/1975 | Johnson | 406/146 X |
| 4,085,975 | 4/1978 | Bentzen-Bilkvist | 406/109 |
| 4,168,864 | 9/1979 | Weeks | 406/109 X |

FOREIGN PATENT DOCUMENTS 2437799  2/1976  Fed. Rep. of Germany ...... 406/109

Primary Examiner—Jeffrey V. Nase
Attorney, Agent, or Firm—Cullen, Sloman, Cantor, Grauer, Scott & Rutherford

[57] ABSTRACT

A system, apparatus and method for unloading dry, bulk, particulate material from a ship, barge or the like into a pressure vessel and thereafter transferring the material into a storage container such as a silo. A venturi has primary and secondary inlets with the primary inlet connected to a blower and the secondary inlet connected to the pressure vessel. Air from the blower is forced through the venturi primary inlet to create a flow of primary air through the venturi and to induce a suction at the venturi secondary inlet. The suction is coupled to the pressure vessel thus drawing the particulate material into the pressure vessel. After the pressure vessel is full, air from the blower is forced into the pressure vessel to transfer the material from the pressure vessel to the silo. The steps of filling the pressure vessel and transferring the material from the pressure vessel to the silo are repeated in alternating sequence. During the transfer of material from the pressure vessel to the silo, the venturi is bypassed to terminate both the flow of primary air through the venturi and the induced suction in the pressure vessel.

2 Claims, 2 Drawing Figures

VENTURI BARGE UNLOADING SYSTEM

BACKGROUND OF THE INVENTION

This invention relates to a barge unloading system and, more particularly, to an improvement in a system for unloading dry, bulk, particulate material from a barge, ship or other container into an intermediate holding container or pressure vessel, commonly called a reloader, and thereafter transferring the material into a storage container such as a silo.

It is well known to unload a barge by a vacuum technique where the dry, bulk, particulate material such as cement powder, grain, fertilizer or the like is transferred by suction from the barge into a pressure vessel or reloader and thereafter transferred, under pressure, into a more permanent storage container such as a silo. A system of this type is disclosed in U.S. Pat. No. 3,373,883, where a plurality of reloaders may be used and while one of the reloaders is being filled with material from the barge, the other reloader is being emptied by transferring the particulate material therefrom into a silo. This is referred to as a push-pull system because some particulate material is being pushed, by air, from one reloader to the silo while additional particulate material is being pulled, by suction, from the barge into the other reloader.

Various systems have been developed for creating a reduced pressure or suction in the reloader so that the reloader may be filled with particulate material from the barge. One such system, as described in U.S. Pat. No. 3,373,883, utilizes a source of vacuum to create the reduced pressure or suction in the reloader.

Another system, which is also well-known, is the use of a venturi to induce the desired suction necessary to fill the reloader. Specifically, as described in U.S. Pat. No. 3,372,958, air from a blower is forced through a venturi to create a primary air stream and this primary air stream induces a suction at the secondary inlet of the venturi. By connecting the secondary venturi inlet to the reloader, the induced suction draws the particulate material into the reloader from the barge.

Yet another type of venturi-induced suction system is disclosed in U.S. Pat. No. 3,861,830 which includes a cyclone type of separator for removing any dust from the suction line.

In each of the systems which operate on the venturi principle, a reciprocating valve is part of the venturi system and this valve moves between opposite positions to alternatively permit or prevent the induced suction from being created.

The present invention eliminates the need for the reciprocating valve as part of the venturi system by providing for completely by-passing the venturi during the emptying of the reloader into the pressure vessel.

The aforementioned venturi systems also include a flap-type discharge valve which operates based upon pressure differentials to alternately permit or prevent emptying of the reloader. However, the presence of any larger chunks of particulate material, such as those larger chunks which may be formed in the otherwise dry material because of some moisture or condensation during unloading has, on certain occasions, prevented the flap valve from properly and completely closing.

The present invention overcomes this problem by providing hydraulic pressure solenoid controlled valves through which the particulate material flows rather than valves which operate solely based upon pressure differentials.

Furthermore, the prior art systems, including venturi operated systems are extremely expensive to manufacture. In addition, the prior systems usually require special cranes and hoisting equipment to move the equipment relative to the barge or ship.

SUMMARY OF THE INVENTION

The present invention is directed to an improved unloading system, method and apparatus for transferring dry, bulk, particulate material from a ship, barge, or the like into a temporary pressure vessel such as a reloader and thereafter transferring the material to a storage container or silo. The present system includes a venturi through which air is forced to create a primary air stream and to induce a suction in the pressure vessel thus drawing the particulate material into the pressure vessel. Thereafter, the venturi is by-passed to terminate both the primary air stream and the induced suction and the air is introduced into the pressure vessel to transfer the material from the pressure vessel into a storage container.

According to the present invention, the various valves through which material flows are hydraulic pressure solenoid controlled rather than controlled to open or close in response to pressure differentials, thus avoiding the problems which occur if the valves were not fully and completely closed.

The present invention provides many benefits when compared to the prior art. For example, the apparatus itself can be handled by either conventional cranes or by the conventional hoisting apparatus with which ships are usually equipped. In addition the present invention provides greater efficiency by minimizing the overall length of the induced suction path. Finally, as described hereinafter, the present system provides a remarkable decrease in cost and increase in efficiency over the prior art.

BRIEF DESCRIPTION OF THE DRAWINGS

The aforementioned objects and advantages of the present invention, together with other objects and advantages which may be attained by its use, will become more apparent upon reading the following detailed description of the invention taken in conjunction with the drawings.

In the drawings, wherein like reference numerals identify corresponding components.

DETAILED DESCRIPTION OF THE INVENTION

Figure 1:
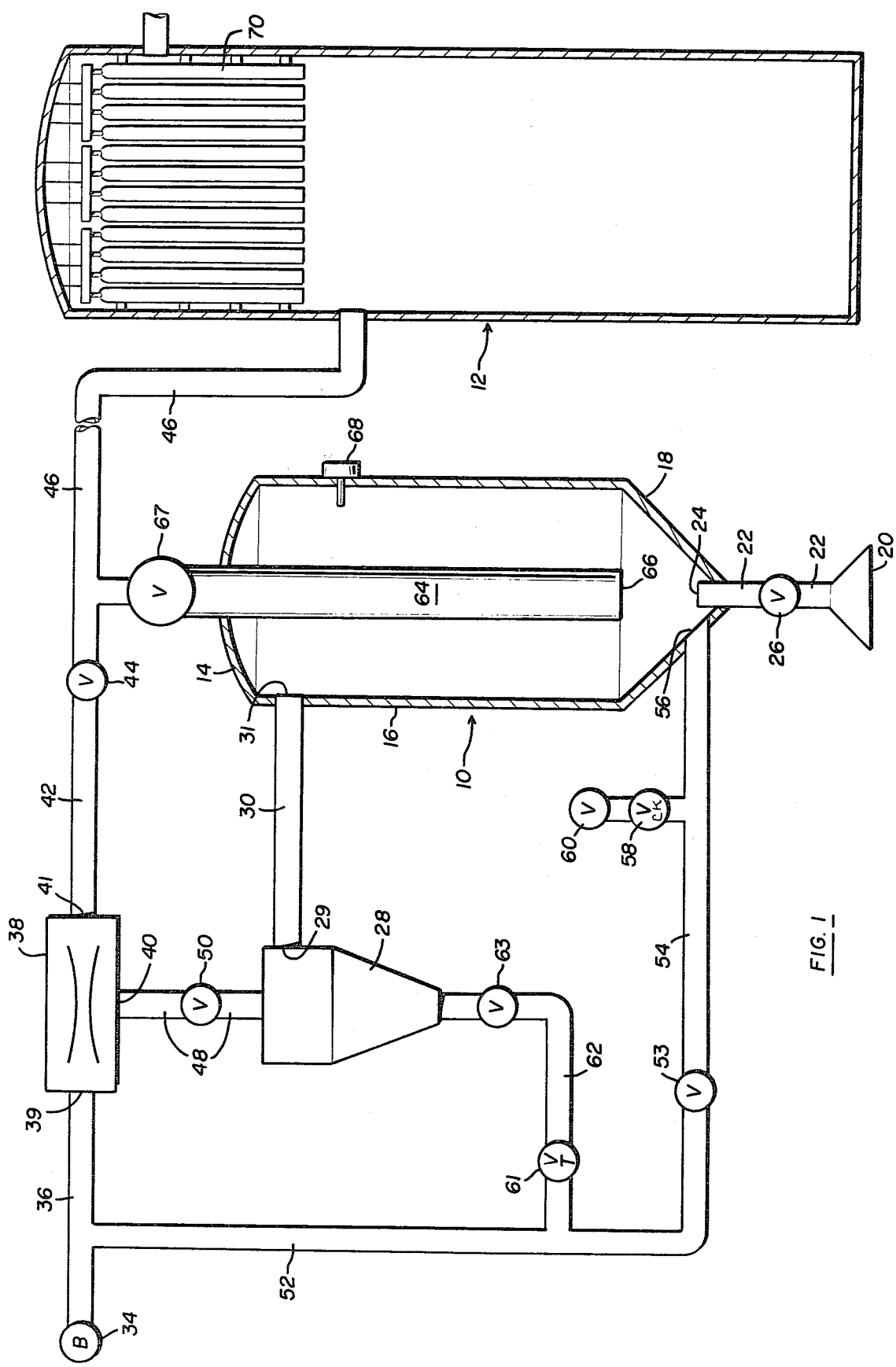
FIG. 1 is a diagrammatic illustration of the system, method and apparatus of the present invention.

With reference to FIG. 1, a system is illustrated according to the principles of the present invention. The present system includes a pressure vessel or reloader 10 which is to be filled with cement powder or other dry, bulk, particulate material from a barge, ship or the like which material is ultimately transferred to a more permanent storage container such as a silo 12. The pressure vessel 10 is a generally cylindrical container having a domed top 14, a generally vertical side wall 16 and a conical or domed bottom 18. The pressure vessel or reloader 10 is generally circular in plan view.

Means are provided for filling the pressure vessel with dry, bulk, particulate material. Specifically, a nozzle 20 is provided and is to be inserted into the dry, bulk, particulate material. One end of the nozzle is open for insertion into the dry, bulk, particulate material and the other end of the nozzle 20 is connected to one end of a conduit 22. The other end of the conduit 22 enters the bottom of the pressure vessel at an inlet port 24. Intermediate the length of the conduit 22 is a valve 26. Thus the pressure vessel 10 is loaded or filled from the bottom. The nozzle preferably includes rotating mechanical aerators such as the type disclosed in U.S. Pat. No. 4,140,350.

As part of the apparatus of the present invention a conventional cyclone dust separator is provided. The cyclone dust separator 28 has an inlet 29 connected by conduit 30 to a port 31 near the top of the vertical side wall 61 of the pressure vessel.

As a further part of the means for filling the pressure vessel 10 a blower 34 or source of compressed air is provided with the output of the blower connected to a conduit 36. Compressed air from the blower flows through the conduit 36 and through a venturi 38. The venturi 38 has a primary inlet 39, a secondary inlet 40, and an outlet 41. Hence the compressed air enters the primary venturi inlet 39, flows through the venturi 38 and exits from the venturi outlet 41 into a conduit 42. The flow of air as described is referred to as the primary airstream or flow of primary air. The path of the primary airstream continues from conduit 42, through a valve 44 to another conduit 46. The conduit 46 is connected to the silo 12.

To complete the description of those parts of the present system which comprise the means for filling the reloader or pressure vessel, a conduit 48 is provided from the top or outlet of the cyclone separator 28 to the secondary inlet 40 of the venturi 38, and this conduit 48 has a valve 50 intermediate the cyclone separator 28 and the venturi 38.

Prior to explaining the operation of the system, the remaining parts of the apparatus and system will be described including the means for emptying the reloader 10 so that the contents of the reloader are transferred to the silo 12. Specifically, the blower 34, which functions both in the filling and in the emptying of the reloader, is connected through a conduit 52 and through a valve 53 and a second conduit 54 to an inlet port 56 adjacent the bottom of the pressure vessel. An aeration pad such as that described in U.S. Pat. No. 4,085,975 may be provided in the conical bottom 18 of the pressure vessel 10. An optional check valve 58 may be provided to permit ambient air to enter conduit 54 and hence enter the bottom of the reloader 10. A valve 60 may be provided on the opposite side of check valve 58 from the reloader so that closing valve 60 by-passes operation of the check valve 58. When valve 60 is open, check valve 58 operates to bleed air into the pressure vessel during filling of the pressure vessel, to aerate the particulate material, as described in U.S. Pat. No. 4,085,975.

Air from the blower 34 also flows through conduit 52, a valve 61, conduit 62 and valve 63 to the bottom of the cyclone dust separator.

Within the pressure vessel 10 there is provided an elongated hollow vertical pipe or conduit 64 which has an open first end 66 interiorly of the pressure vessel and substantially adjacent the lower conical bottom of the pressure vessel. This elongated pipe or conduit 64 extends upwardly along substantially the entire length of the pressure vessel 10 and extends outwardly through the domed top 14 of the pressure vessel and thereafter through a valve 67. The opposite side of valve 67 is coupled to the conduit 46. As is conventional, a high level detector 68 is provided in the pressure vessel to provide a signal when the level of the particulate material in the pressure vessel reaches the height of the detector.

Now that the system and all its component parts have been described, the function and operation of the system will be explained in detail. Consider the situation when the pressure vessel is empty and it is desired to fill the pressure vessel. Those valves identified by even reference numerals, i.e., valves 26, 44 and 50 are open and those valves identified with odd reference numerals, valves 53, 61, 63 and 67 are closed. Valve 60 will also be open if it is desired to aerate the dry, bulk, particulate material during the filling of the pressure vessel. Blower 34 is actuated to force air through the conduit 36, the venturi 38 and the conduits 42, 46 to the silo. The flow of air through the venturi from the blower may be described as a primary air stream or a flow of primary air. As is conventional with the use of a venturi, the flow of primary air through the venturi induces a suction or reduced pressure at the secondary inlet 40 of the venturi. Since a flow path is established from the nozzle 20, through conduit 22, through the reloader 10, conduit 30, cyclone separator 28 and conduit 48 to the secondary inlet 40 of the venturi, the induced suction exhausts the air in the flow path. The continuing flow of air from blower 34 through the venturi sustains the induced suction which causes the dry, bulk, particulate material to flow through the nozzle 20 and conduit 22 and into the reloader to fill the reloader. The particulate material flows as a fluidized medium and any air flowing with the dry, bulk, particulate material into the pressure vessel will continue through the conduit 30 and into the cyclone separator 28. It may be expected that some of this air will be laden with dust and particulate material and, as this dust laden or particulate laden air enters the cyclone separator 28, the dust and particulate matter settles to the bottom of the cyclone separator 28 thus cleansing the air. The dust-free air exits from the cyclone separator through conduit 48 and into the secondary inlet 40 of the venturi 38. The blower or source of compressed air 34 continues to operate inducing a suction to fill the reloader until the particulate material reaches the high level indicator 68 and the filling cycle is now complete.

The compressed air flowing through the venturi, and the clean air from the cyclone separator 28 flow through the conduit 42 and conduit 46 to the silo 12.

Once the reloader is full, the next step is to empty the contents of the reloader 10 into the silo. Valves 26, 44 and 50 are closed and valves 53, 63 and 67 are opened. Since valve 26 is closed, no more particulate material enters the reloader. Since valves 44 and 50 are closed, air from the blower 34 will not pass through the venturi. Thus the venturi is by-passed, there is no longer a primary air stream flowing through the venturi and there is no longer any suction induced by the venturi. Air from the blower 34 flows through the conduit 52 rather than through the venturi. Valve 61 is a manually controlled valve which functions to adjust or divide the air flow into two paths, the first path being through conduit 62 and the second path being through conduit 54. Thus some of the air passing through the conduit 52 flows through the valve 53 and the conduit 54 into the bottom of the pressure vessel as controlled by valve 61 and this air may be utilized to aerate the dry, bulk, particulate materials in the pressure vessel during the unloading of the pressure vessel. It should be pointed out that aeration may be accomplished during filling the reloader, during emptying the reloader or both. If it is desired to aerate only during emptying the reloader, valve 60 should always be closed. If it is desired to aerate only during filling the reloader, valve 53 should always be closed and valve 60 should always be open. With valve 60 open, check valve 58 admits air into the reloader only when the pressure in the reloader is less than the ambient air pressure. From the foregoing it is clear that aerating while filling and emptying the reloader is accomplished by always leaving valve 60 open and by opening valve 53 only during the emptying of the reloader.

The remainder of the air from the blower 34 flowing through the conduit 52 passes through manual valve 61, then through conduit 62 and through valve 63 into the bottom of the cyclone separator 28. At this time it should be understood that valve 61 is in the nature of a throttle valve in that it may be adjusted to regulate the amount of air flowing therethrough while all the remaining valves may have only a fully open and fully closed position. Thus the use of a throttle valve 61 insures that some air flows through the valve 53 and conduit 54 to aerate the material in the pressure vessel 10 during emptying, if such aeration is desired. The remainder of the air, and by far the majority of the air flowing through the conduit 52 passes through the throttle valve 61 through conduit 62 and valve 63 into the bottom of the dust collector 28 thus cleaning out the dust collector and blowing all of the dust collected therein through conduit 30 and back into the pressure vessel 10. The air flowing into the pressure vessel 10 through conduit 30 thus pressurizes the reloader and forces the dry, bulk, particulate material down within the reloader into the opened bottom 66 of the conduit 64, up through the conduit 64, through valve 67 to the conduit 46 and thereafter directly to the silo. The silo may be provided with dust collector bags or filter bags 70 to remove any dust or particulate material from the air entering the silo before such air enters the atmosphere.

The present invention has certain unexpected improvements when contrasted to the prior art. For example, using a blower pressure of 40 p.s.i. and a small reloader (i.e., 4 foot diameter 6 foot height, nominal volume less than 70 cubic feet) the reloader may be filled in 17 seconds and emptied in 20 seconds resulting in a transfer rate in excess of 100 tons per hour from barge to silo. This is much faster than prior devices at a cost of about 25% of the cost of prior devices. To accomplish this result, we have discovered that the suction path must be as short as possible since the induced suction must exhaust the suction path at the beginning of each fill cycle. For this reason the conduits 22, 30, and 48 should be extremely short and to achieve this objective, the venturi, dust separator and nozzle may all be physically attached to and move with the reloader.

Yet another benefit is that the present invention is portable, i.e., the reloader, venturi and cyclone separation, along with their associated conduits, may be lowered into the hold of a ship.

Figure 2:
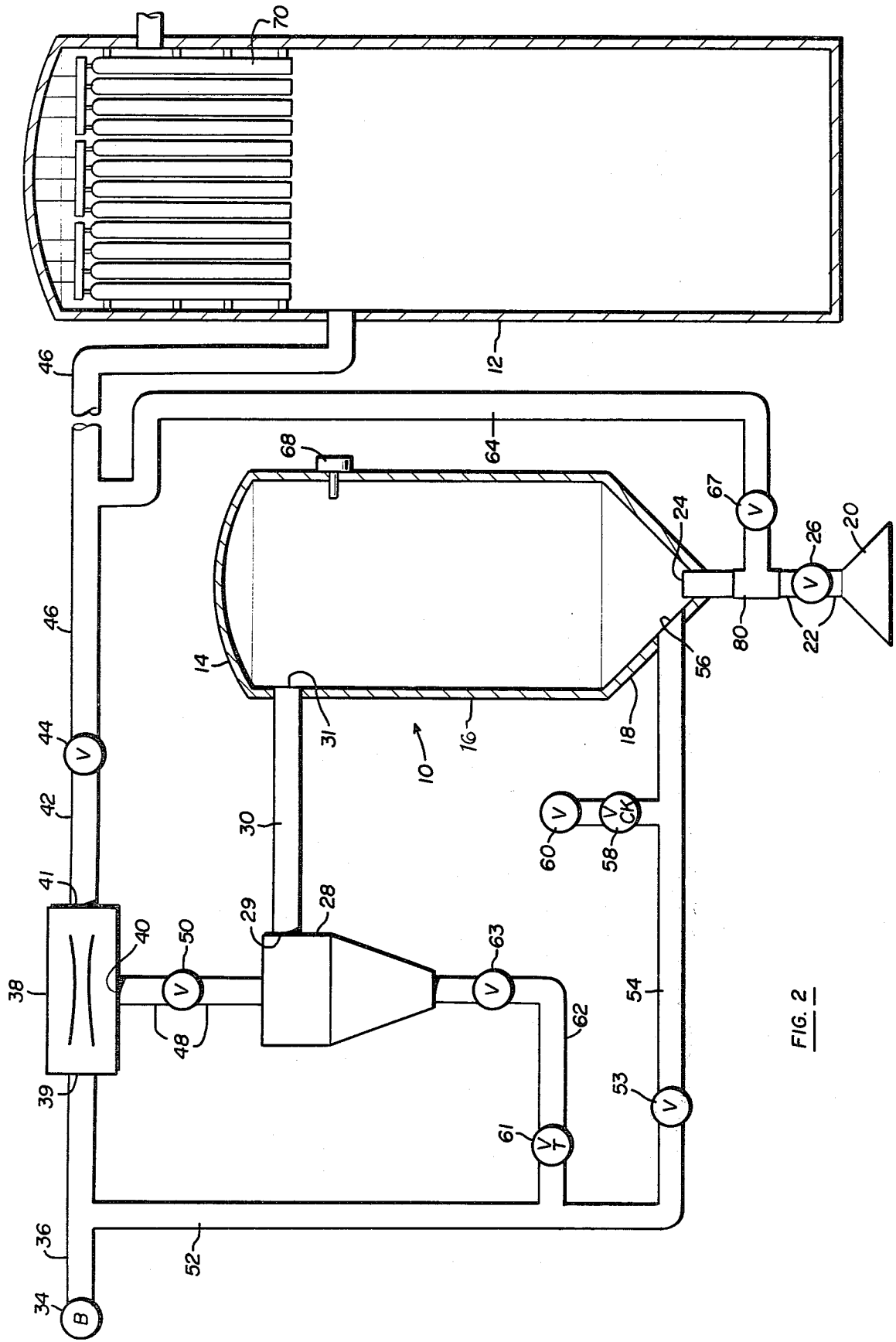
FIG. 2 is a partial diagrammatic illustration of a modification of the present invention.

Reference should now be had to FIG. 2 where a modification of the present invention is disclosed. FIG. 2 illustrates a system which differs from the system of FIG. 1 primarily because the discharge conduit 64 is positioned exteriorly of the reloader. Thus there is no aperture in the domed top 14 of the reloader. Furthermore, the inlet conduit 22 from the nozzle 20 includes a "T" fitting 80 intermediate the valve 26 and the inlet 24. One leg of the "T" fitting couples conduit 22 and valve 26 to the inlet 24 and particulate material thus enters the reloader 10. The other leg of the "T" fitting couples the inlet 24 to valve 67 and to conduit 64. Thus when the reloader is to be emptied, it is still emptied from the bottom, i.e., material flows down through port 24, fitting 80, valve 67 and conduit 64 to the silo.

The foregoing is a complete description of the present invention. Many changes and modifications may be made without departing from the spirit and scope of the present invention. Thus the present invention should be limited only by the following claims.

What is claimed is:

1. In a method for unloading dry, bulk, particulate material from a ship, barge or the like into a pressure vessel and for thereafter transferring said material from said pressure vessel to a storage container or silo, said method including forcing air from a blower through a venturi for creating a flow of primary air through said venturi and for inducing a suction through the venturi, drawing said particulate material from said ship into said pressure vessel by said induced suction for filling said pressure vessel, and thereafter forcing air from said blower into said pressure vessel for transferring the material from said pressure vessel to said storage container, said steps of filling and transferring being repeated in alternating sequence, the improvement comprising the steps of:

providing a cyclone separator having a first inlet connected to said pressure vessel by a first conduit means and an outlet at the top of the cyclone separator which is connected to said venturi by a second conduit means, and first, second, third and fourth valves, each of which is exterior to said pressure vessel, said first valve connected in a third conduit means between said venturi and said storage container, said second valve connected in said second conduit means between said cyclone separator and said venturi, said third valve connected in a fourth conduit means between said blower and a second inlet to said cyclone separator at the bottom of said cyclone separator, and said fourth valve connected between said pressure vessel and said storage container;

opening said first and second valves and closing said third and fourth valves;

then directing air from said blower through said venturi and then through said first valve exteriorly of said pressure vessel for filling said pressure vessel with particulate material by said induced suction wherein the drawing of said particulate material into said pressure vessel includes drawing air through said cyclone separator first inlet and exhausting air to said venturi through said second conduit means;

thereafter closing said first and second valves and opening said third and fourth valves for by-passing the venturi and terminating both said flow of primary air through the venturi and said induced suction;

then directing air from said blower through said third valve exteriorly of said pressure vessel and into the bottom of said cyclone separator and thereafter into said pressure vessel for transferring said material from the pressure vessel through said fourth valve and then to said storage container, and said step of transferring material from said pressure vessel to said storage container includes forcing any particulate material in said cyclone separator back through said cyclone separator first inlet and into said pressure vessel and thereafter into said storage container; and wherein said transferring of materials to said pressure vessel or from said pressure vessel to said storage container includes providing a fifth valve in said fourth conduit means which adjusts air flow between said blower, said third valve, and said pressure vessel, and opening said fifth valve for throttling a portion of the air from said blower into a different part of said pressure vessel for aerating the dry, bulk, particulate material in said pressure vessel.

2. In a system for unloading dry, bulk, particulate material from a ship, barge, or the like into a pressure vessel and thereafter transferring the material from said pressure vessel to a storage container or silo including a venturi having first and second inlets and a first outlet, a blower for forcing air through said first venturi inlet and said venturi outlet for creating a flow of primary air through said venturi and for thereby inducing a suction at said venturi second inlet; means coupling said venturi second inlet to said pressure vessel; and nozzle means connected to said pressure vessel for filling said pressure vessel with dry, bulk, particulate material when said suction is induced at said venturi second inlet; the improvement comprising:

a cyclone separator connected to said venturi second inlet, said pressure vessel and said blower, said cyclone separator having a first inlet connected to said pressure vessel by a first conduit means and an outlet at the top of the cyclone separator which is connected to said venturi second inlet by a second conduit means, valve means including first, second, third and fourth valves each of which is positioned exteriorly of said pressure vessel, said first valve connected in a third conduit means between said venturi outlet and said storage container, said second valve connected in said second conduit means between said cyclone separator and said second venturi inlet, said third valve connected in a fourth conduit means between said blower and a second inlet to said cyclone separator at the bottom of said cyclone separator, and said fourth valve connected between said pressure vessel and said storage container;

said valves being positioned so that on opening said first and second valves and closing said third and fourth valves, air from said blower is directed through said venturi and then through said first valve and suction is induced in said pressure vessel and through said second valve, said cyclone separator receiving particles and air through said first separator inlet from said pressure vessel and separating said particles from air during the filling of said pressure vessel in response to said induced suction and exhausting air to said venturi through said second conduit means; and so that on opening said third and fourth valves and closing said first and second valves, air from said blower bypasses said venturi for terminating said flow of primary air through said venturi for terminating said induced suction, and air from said blower is directed through said third valve and into the bottom of said cyclone separator for emptying any particles from said cyclone separator back through said cyclone separator first inlet and into said pressure vessel for transferring said dry, bulk, particulate material from said pressure vessel through said fourth valve and to said silo; and wherein said valve means includes a fifth valve in said fourth conduit means which adjusts air flow between said blower, said third valve, and said pressure vessel, said fifth valve being operable to throttle air from said blower into said pressure vessel for aerating said dry, bulk, particulate material as part of the transferring of said dry, bulk, particulate material to said pressure vessel or from said pressure vessel to said silo.

* * * * *